(12) United States Patent
Ishigaki et al.

(10) Patent No.: US 8,830,429 B2
(45) Date of Patent: Sep. 9, 2014

(54) LIQUID CRYSTAL DISPLAY DEVICE

(75) Inventors: Toshimasa Ishigaki, Chiba (JP); Fumio Takahashi, Mobara (JP)

(73) Assignee: Japan Display Inc., Tokyo (JP)

( * ) Notice: Subject to any disclaimer, the term of this patent is extended or adjusted under 35 U.S.C. 154(b) by 403 days.

(21) Appl. No.: 12/878,109

(22) Filed: Sep. 9, 2010

(65) Prior Publication Data

US 2011/0058133 A1 Mar. 10, 2011

(30) Foreign Application Priority Data

Sep. 9, 2009 (JP) ................................. 2009-208067

(51) Int. Cl.
*G02F 1/1333* (2006.01)
*G02F 1/1343* (2006.01)

(52) U.S. Cl.
USPC .......................................... 349/138; 349/141

(58) Field of Classification Search
CPC ....................... G02F 1/133345; G02F 1/34363
USPC ............................ 349/47, 141, 138
See application file for complete search history.

(56) References Cited

U.S. PATENT DOCUMENTS

| | | | |
|---|---|---|---|
| 6,630,977 B1 | 10/2003 | Yamazaki et al. | |
| 8,023,088 B2 | 9/2011 | Nakao | |
| 2002/0089631 A1* | 7/2002 | Lee et al. | 349/141 |
| 2006/0007380 A1* | 1/2006 | Yamazaki et al. | 349/141 |
| 2007/0298538 A1* | 12/2007 | Tanabe et al. | 438/107 |

FOREIGN PATENT DOCUMENTS

| | | |
|---|---|---|
| JP | 2001-33824 | 2/2001 |
| JP | 2007-328210 | 12/2007 |
| JP | 2009-133954 | 6/2009 |
| JP | 2010-102220 | 5/2010 |

* cited by examiner

*Primary Examiner* — Jessica M Merlin
(74) *Attorney, Agent, or Firm* — Antonelli, Terry, Stout & Kraus, LLP.

(57) ABSTRACT

In an IPS-type liquid crystal display device, peeling-off between a common electrode formed in a matted manner in plane and an interlayer insulation film is prevented. The common electrode is formed on an organic passivation film in a matted manner in plane, the interlayer insulation film is formed on the common electrode, and a comb-teeth-shaped pixel electrode is formed on the interlayer insulation film. The pixel electrode is connected with a source electrode via a through hole formed in the organic passivation film and an inorganic passivation film.

7 Claims, 13 Drawing Sheets

B-B

LIQUID CRYSTAL DISPLAY DEVICE

CROSS-REFERENCE TO RELATED APPLICATION

The present application claims priority from Japanese application JP 2009-208067 filed on Sep. 9, 2009, the content of which is hereby incorporated by reference into this application.

BACKGROUND OF THE INVENTION

The present invention relates to a display device, and more particularly to a lateral-electric-field liquid crystal display device which exhibits an excellent field-of-view characteristic and high reliability.

In a liquid crystal display device, a TFT substrate on which pixels each of which includes a pixel electrode, a thin film transistor (TFT) and the like are formed in a matrix array and a counter substrate which faces the TFT substrate in an opposed manner and on which color filters are formed at positions corresponding to the pixel electrodes on the TFT substrate are arranged, and liquid crystal is sandwiched between the TFT substrate and the counter substrate. In the liquid crystal display device, an image is formed by controlling optical transmissivity of liquid crystal molecules for every pixel.

The liquid crystal display device is flat and lightweight and hence, the application of the liquid crystal display device has been spreading in various fields. A miniaturized liquid crystal display device has been popularly used in mobile phones, DSCs (Digital Still Cameras) and the like. A field-of-view characteristic is important in the liquid crystal display device. The field-of-view characteristic is a phenomenon in which the brightness changes or chromaticity changes between a case where a screen of the liquid crystal display device is viewed from a front side and a case where the screen of the liquid crystal display device is viewed from an oblique direction. An IPS (In Plane Switching) method which operates liquid crystal molecules by a horizontal electric field exhibits the excellent field-of-view characteristic.

Although various IPS methods are known, for example, there has been known a method in which a common electrode is formed in a matted manner in plane and a comb-teeth pixel electrode is arranged above the common electrode with an insulation film sandwiched therebetween, and liquid crystal molecules are rotated by an electric field generated between the pixel electrode and the common electrode. Since this method can increase the optical transmissivity, this method has been used as a mainstream currently. A liquid crystal display device which adopts such a method is disclosed in JP-A-2007-328210 (patent document 1), for example.

SUMMARY OF THE INVENTION

The IPS-type liquid crystal display device differs from a conventional TN-type liquid crystal display device or the like in structure and hence, in the miniaturization of the liquid crystal display device or the reduction of thickness of the liquid crystal display device, there arise drawbacks in the IPS-type liquid crystal display device which differ from drawbacks that the conventional TN-type liquid crystal display device or the like has. In the TN (Twisted Nematic) method and the like, pixel electrodes are formed on a TFT substrate, and a counter electrode is formed over the whole surface of a counter substrate. To the contrary, in the IPS method, the pixel electrodes and the counter electrodes are formed on the TFT substrate and hence, the constitution of the TFT substrate side of the IPS-type liquid crystal display device is more complicated than the constitution of the TFT substrate side of the TN-type liquid crystal display device.

Recently, a miniaturized liquid crystal display device is also requested to satisfy a high-definition screen such as VGA (Video Graphics Array; 640×480 dots). Here, a dot is formed of a set of three pixels consisting of a red pixel, a green pixel and a blue pixel and hence, the number of pixels becomes 1920×480. To realize VGA on a three-inch screen, a short-side size of the pixel becomes extremely small, that is, 32 μm.

Even when the pixel can be made small in size, to maintain predetermined transmissivity, it is necessary to increase a ratio at which an area of the pixel electrode occupies in the pixel as much as possible by arranging a TFT, through holes and the like in a small area. This increase of the pixel electrode area ratio decreases the tolerance in design or the tolerance in process. One of the large drawbacks relevant to the tolerance in process is the film peeling-off which occurs between various stacked films.

FIG. 15 is a perspective view of a pixel portion of a TFT substrate of an IPS-type liquid crystal display device compatible with VGA. The pixel portion covering two pixels is described in FIG. 15. In FIG. 15, a region which is surrounded by video signal lines 40 indicated by a dotted line and scanning signal lines 30 indicated by a dotted line constitutes the pixel. The reason that the video signal lines 40 and the scanning signal lines 30 are indicated by the dotted line is that these lines are formed below an organic passivation film (also referred to as a leveling film) which is formed of an organic insulation film. A pitch of the video signal lines in FIG. 15 is approximately 32 μm. In the inside of the pixel, a comb-teeth-shaped pixel electrode is connected with a source electrode 107 of the TFT via a through hole 130 formed in the organic passivation film.

Since FIG. 15 is a schematic view, the TFT is described by a symbol. As shown in FIG. 15, the organic passivation film (leveling film, organic insulation film) has a large thickness and hence, a through hole 130 formed in the organic passivation film occupies a large area in the pixel. Further, the organic passivation film has a large thickness of approximately 2 μm and hence, the large unevenness is formed in the vicinity of the through hole 130. Although not shown in FIG. 15, over the organic passivation film, a common electrode formed in a matted manner in plane and an interlayer insulation film are formed between the organic passivation film and the pixel electrode.

When a pixel pitch becomes small, being influenced by the unevenness of the organic passivation film, a stress is liable to be generated in the common electrode, the interlayer insulation film or the like formed on the organic passivation film, and particularly, the film peeling-off between the interlayer insulation film and the common electrode is liable to occur. This film peeling-off is liable to occur in a region A shown in FIG. 15 which is disposed between the through holes 130, for example.

Accordingly, it is an object of the present invention to provide an IPS-type liquid crystal display device which exhibits a high manufacturing yield and high reliability by preventing the peeling-off of an interlayer insulation film or the like formed on an organic passivation film.

The present invention has been made to overcome the above-mentioned drawbacks, and specific means of the present invention are as follows.

(1) The present invention is directed to a liquid crystal display device in which a first insulation film is formed on a source electrode which is connected with a source region of a thin film transistor so as to cover the source electrode, an organic insulation film is formed on the first insulation film, a common electrode is formed on the organic insulation film, a second insulation film is formed on the common electrode so as to cover the common electrode, and a pixel electrode which has a comb-teeth-shaped portion is formed on the second insulation film, wherein the organic insulation film and the first insulation film have a through hole having a large hole corresponding to an upper portion of the organic insulation film, a small hole corresponding to the first insulation film and an inclined portion formed in the organic insulation film, a first opening portion is formed in the second insulation film such that the first opening portion surrounds the large hole of the through hole, a second opening portion is formed in the common electrode such that the second opening portion surrounds the large hole of the through hole, the pixel electrode is connected with the source electrode via the through hole, and the first opening portion which is formed in the second insulation film is larger than the large hole formed in the organic insulation film and is smaller than the second opening portion formed in the common electrode.

(2) In the liquid crystal display device having the constitution (1), in the through hole, the small hole formed in the first insulation film is formed by etching using the organic insulation film as a mask.

(3) The present invention is further directed to a liquid crystal display device in which a first insulation film is formed on a source electrode which is connected with a source region of a thin film transistor so as to cover the source electrode, an organic insulation film is formed on the first insulation film, a common electrode is formed on the organic insulation film, a second insulation film is formed on the common electrode so as to cover the common electrode, and a pixel electrode which has a comb-teeth-shaped portion is formed on the second insulation film, wherein the organic insulation film and the first insulation film have a through hole having a large hole corresponding to an upper portion of the organic insulation film, a small hole corresponding to the first insulation film and an inclined portion formed in the organic insulation film, an opening portion is formed in the second insulation film such that the opening portion surrounds the small hole of the through hole, the pixel electrode is connected with the source electrode via the through hole, and the opening portion which is formed in the second insulation film is larger than the small hole formed in the first insulation film and partially overlaps with the inclined portion formed in the organic insulation film.

(4) In the liquid crystal display device having the constitution (3), assuming a diameter or a width of the opening portion formed in the second insulation film as W1 and a diameter or a width of the small hole formed in the first insulation film as W2, a relationship of W1>W2+2 μm is satisfied.

(5) The present invention is still further directed to a liquid crystal display device in which a first insulation film is formed on a source electrode which is connected with a source region of a thin film transistor so as to cover the source electrode, an organic insulation film is formed on the first insulation film, a common electrode is formed on the organic insulation film, a second insulation film is formed on the common electrode so as to cover the common electrode, and a pixel electrode which has a comb-teeth-shaped portion is formed on the second insulation film, wherein the organic insulation film and the first insulation film have a through hole having a large hole corresponding to an upper portion of the organic insulation film, a small hole corresponding to the first insulation film and an inclined portion formed in the organic insulation film, an opening portion is formed in the second insulation film in the vicinity of the through hole, the pixel electrode is connected with the source electrode via the through hole, and the opening portion which is formed in the second insulation film is larger than the small hole formed in the first insulation film, and the second insulation film is not brought into contact with the first insulation film.

(6) In the liquid crystal display device having any one of the constitutions (1) to (5), the first insulation film and the second insulation film are formed using SiN.

(7) In the liquid crystal display device having any one of the constitutions (1) to (6), the second insulation film is formed using SIN at a temperature of not more than 300° C.

According to the present invention, it is possible to apply an IPS method which is characterized by a large field of view and large transmissivity to a miniaturized and high-pixel-definition liquid crystal display device. To be more specific, the present invention can prevent the peeling-off between the interlayer insulation film and the common electrode formed on the organic passivation film thus increasing a manufacturing yield. Further, since an adhesive strength of the interlayer insulation film or the like is increased, the reliability of the liquid crystal display device can be enhanced.

DETAILED DESCRIPTION OF THE INVENTION

Figure 1:
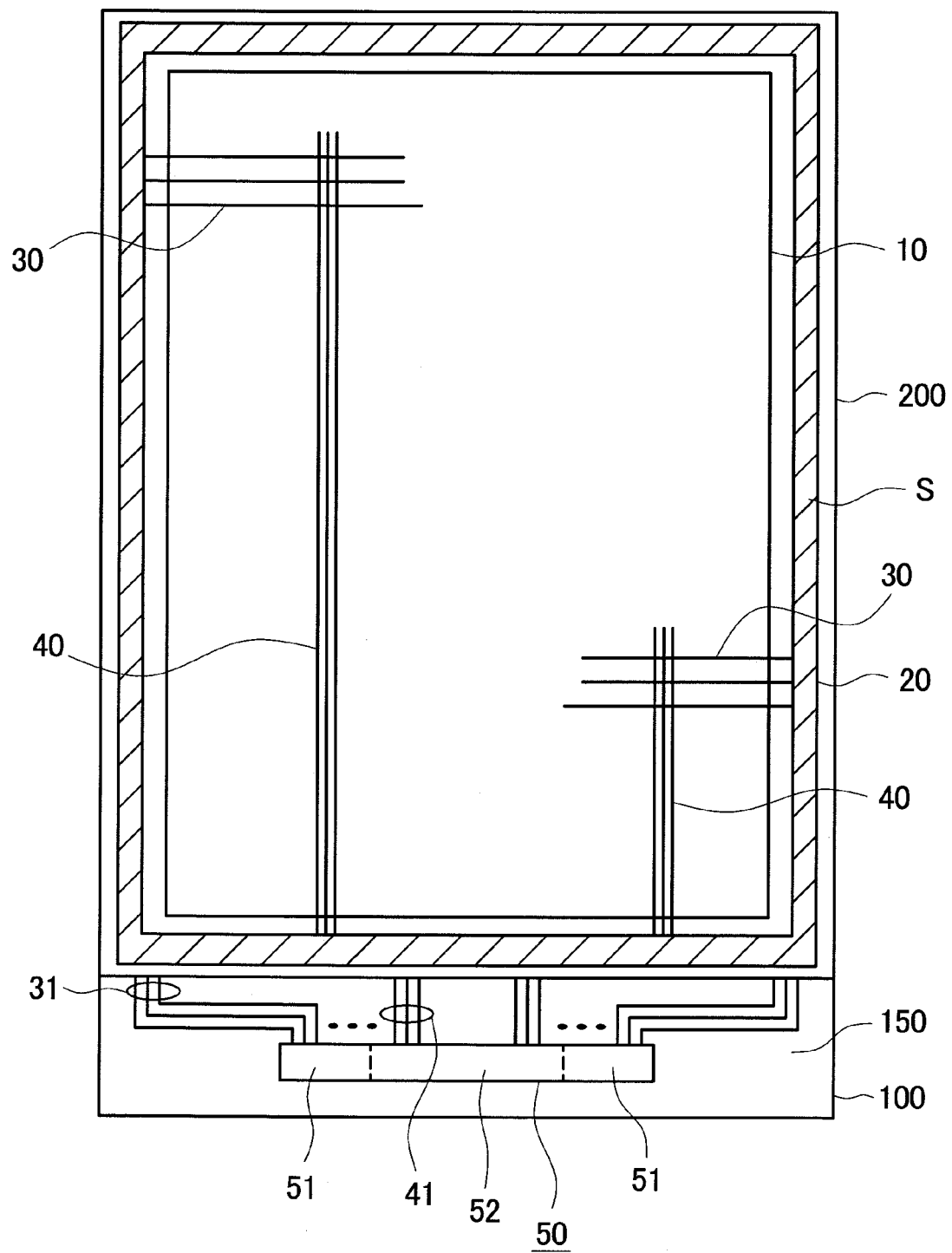
FIG. 1 is a plan view of a liquid crystal display device to which the present invention is applied.

Contents of the present invention are explained in detail in conjunction with embodiments hereinafter.
[Embodiment 1]
FIG. 1 is a plan view of a miniaturized liquid crystal display device used in a mobile phone or the like which is an example of a product to which the present invention is applied. In FIG.

1, a counter substrate 200 is arranged over the TFT substrate 100. A liquid crystal layer not shown in the drawing is sandwiched between the TFT substrate 100 and the counter substrate 200. The TFT substrate 100 and the counter substrate 200 are adhered to each other by a sealing material 20 which is formed between picture frame portions of these substrates. In FIG. 1, liquid crystal is sealed by a dropping method and hence, a sealing hole is not formed.

The TFT substrate 100 is formed larger than the counter substrate 200 in size. On a portion of the TFT substrate 100 projecting from the counter substrate 200, a terminal portion1 150 for supplying a power source, a video signal, a scanning signal and the like to the liquid crystal cells is formed.

Further, an IC driver 50 for driving scanning signal lines 30, video signal lines 40 and the like is arranged on the terminal portion 150. The IC driver 50 is divided into three regions, wherein a video signal drive circuit 52 is arranged in the region at the center, and a scanning signal drive circuit 51 is arranged in the region on both sides.

In a display region 10 shown in FIG. 1, the scanning signal lines 30 extend in the lateral direction and are arranged parallel to each other in the longitudinal direction. The video signal lines 40 extend in the longitudinal direction and are arranged parallel to each other in the lateral direction. Regions which are surrounded by the scanning signal lines and the video signal lines constitute the pixels. The scanning signal lines are connected with the scanning signal drive circuit 51 of the IC driver 50 via scanning-line lead lines 31 extended from both sides of the display regions 10. Video-signal-line lead lines 41 which connect the video signal lines 40 and the IC driver 50 with each other are collected at a lower side of the screen, and are connected with the video signal drive circuit 52 arranged at the center portion of the IC driver 50.

Figure 2:
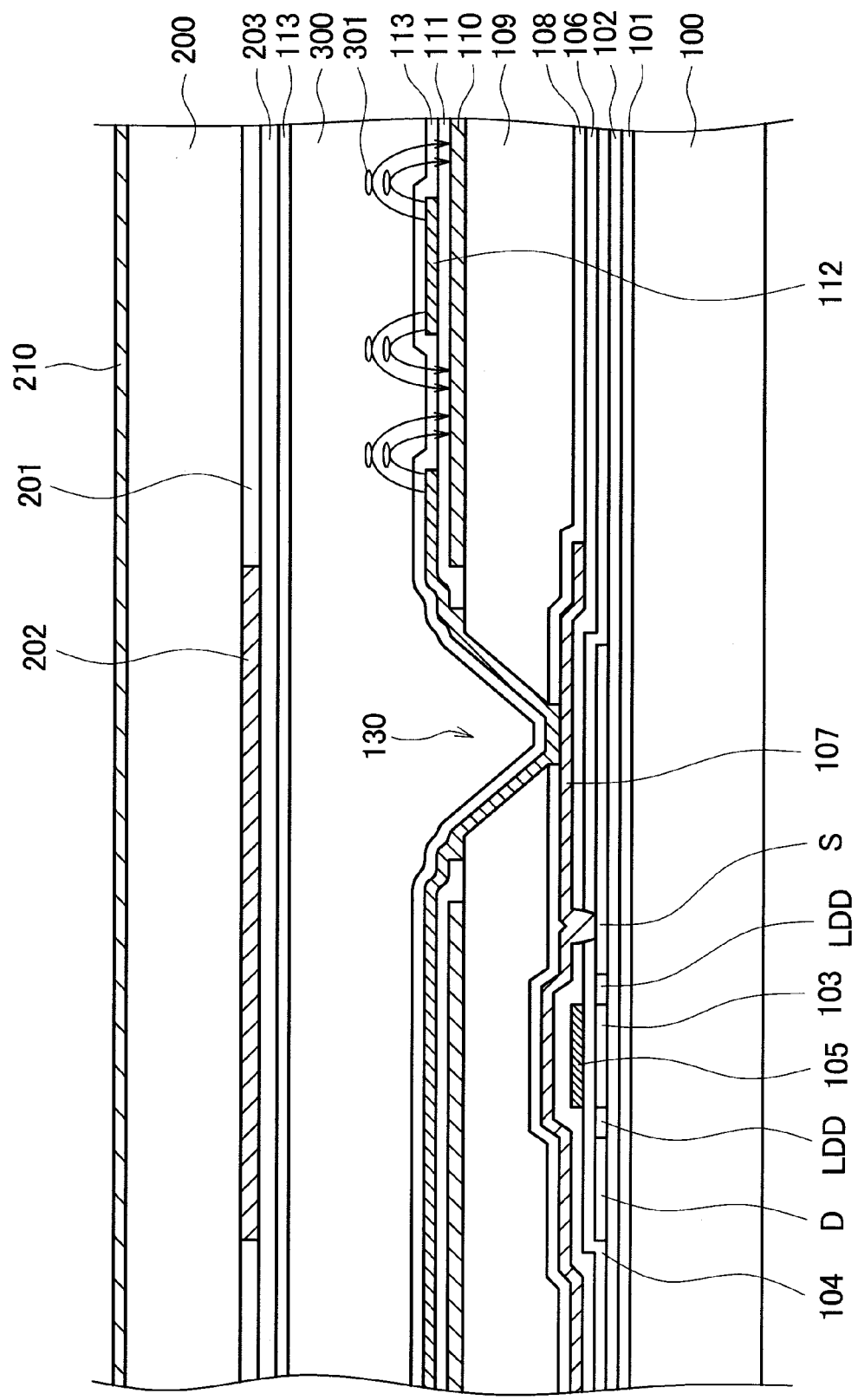
FIG. 2 is a cross-sectional view of a pixel portion of the liquid crystal display device according to an embodiment 1.

FIG. 2 is a cross-sectional view showing the structure of a pixel portion of the display region 10 shown in FIG. 1, FIG. 2 is provided for explaining the structure of an IPS-type liquid crystal display panel to which the present invention is applied. A TFT adopted by this embodiment is a so-called top-gate-type TFT where a gate electrode is arranged above a semiconductor layer. In FIG. 2, on the TFT substrate 100 formed of a glass substrate, a first background film 101 made of SiN and a second background film 102 made of $SiO_2$ are formed by a CVD (Chemical Vapor Deposition) method. The first background film 101 and the second background film 102 are provided for preventing impurities from the TFT substrate 100 from contaminating the semiconductor layer 103.

The semiconductor layer 103 is formed on the second background film 102. The semiconductor layer 103 is formed such that an a-Si film is formed on the second background film 102 by a CVD method and the a-Si film is converted into a poly-Si film by laser-annealing the a-Si film. The poly-Si film is patterned by photolithography.

A gate insulation film 104 is formed on the semiconductor film. The gate insulation film 104 is an $SiO_2$ film. The $SiO_2$ film is formed using, for example, TEOS (tetraethoxysilane) as a raw material gas. This film is also formed by a CVD method. A gate electrode 105 is formed on the gate insulation film 104. The gate electrode 105 is formed on the same layer as the scanning signal line 30 and is formed simultaneously with the scanning signal line 30. The gate electrode 105 is formed of an MoW film, for example. When it is necessary to decrease the resistance of the gate line 105, an Al alloy is used for forming the gate line 105.

The gate electrode 105 is patterned by photolithography. In this patterning, the poly-Si layer is doped with impurities such as phosphorous or boron by ion implantation thus forming a source region S or a drain region D in the poly-Si layer. Further, by making use of a photo resist in patterning the gate electrode 105, an LDD (Lightly Doped Drain) layer is formed between a channel region and a source region S or the drain region D of the poly-Si layer.

Thereafter, an interlayer insulation film 106 is formed using $SiO_2$ such that the interlayer insulation film 106 covers the gate electrode 105. The interlayer insulation film 106 is provided for ensuring insulation between the gate line 105 and the like and a source electrode 107 and the like. The source electrode 107 is formed on the interlayer insulation film 106. In FIG. 2, the source electrode 107 is formed with a large area enough to cover the TFT. On the other hand, the drain region D of the TFT is connected with a drain electrode at a portion not shown in the drawing.

The source electrode 107, the drain electrode and the video signal line 40 are formed on the same layer simultaneously. The source electrode 107 and the drain electrode are, for decreasing the resistance thereof, formed using an AlSi alloy. Since the AlSi alloy generates hillock or Al is diffused into other layer, the source electrode 107 and the drain electrode adopts the structure where an AlSi layer is sandwiched between a barrier layer and a cap layer made of MoW respectively.

For connecting the source electrode 107 and the source region S of the TFT with each other, a through hole is formed in the gate insulation film 104 and the interlayer insulation film 106 so that the source region S of the TFT and the source electrode 107 are connected with each other. An inorganic passivation film (inorganic insulation film) 108 is formed using SiN, for example, so as to cover the source electrode 107, and the inorganic passivation film 108 protects the whole TFT. The inorganic passivation film 108 is formed by a CVD method in the same manner as the first background film 101.

An organic passivation film 109 is formed so as to cover the inorganic passivation film 108. The organic passivation film 109 is formed using a photosensitive acrylic resin. The organic passivation film can be also formed using a silicone resin, an epoxy resin, a polyimide resin or the like besides the acrylic resin. Since the organic passivation film 109 also has a role of a leveling film, the organic passivation film 109 is formed with a large thickness. Although a film thickness of the organic passivation film 109 falls within a range from 1 to 4 µm, the film thickness of the organic passivation film 109 is set to approximately 2 µm in many cases.

To make a pixel electrode 112 and the source electrode 107 conductive with each other, a through hole 130 is formed in the inorganic passivation film 108 and the organic passivation film 109. The organic passivation film 109 is formed using a photosensitive resin. When the photosensitive resin is exposed to light after being applied, only a portion of the photosensitive resin which is exposed to light is dissolved by a specified developer. That is, by using the photosensitive resin for forming the organic passivation film 109, the formation of a photo resist can be omitted. After forming the through hole in the organic passivation film 109, the organic passivation film 109 is baked at a temperature of approximately 230° C. thus completing the organic passivation film 109 in which the through hole is formed.

The through hole is formed in the inorganic passivation film 108 by dry etching using the organic passivation film 109 as a mask. In this manner, the through hole 130 which makes the pixel electrode 112 and the source electrode 107 conductive with each other is formed. Since the organic passivation film 109 has a large thickness, a size of the hole differs between an upper side and a lower side of the through hole 130.

An upper surface of the organic passivation film 109 formed in this manner is leveled or flattened. An amorphous ITO (Indium Tin Oxide) film is formed on the organic passivation film 109 by sputtering, patterning is applied to the amorphous ITO film using a photo resist and, thereafter, the photo resist is etched using an oxalic acid thus patterning a common electrode 110. The common electrode 110 is formed in a matted manner in plane while avoiding the through hole 130. Then, the structure is baked at a temperature of 230° C. so that the ITO film is poly-crystallized whereby the electric resistance of the ITO film is lowered. The ITO film which is a transparent conductive film for forming the common electrode 110 has a thickness of 77 µm, for example.

Thereafter, an interlayer insulation film 111 is formed by a CVD method so as to cover the common electrode 110. A temperature condition of CVD at this point of time is not more than 300° C. (desirably approximately 230° C.), and this CVD is referred to as low-temperature CVD. Thereafter, the interlayer insulation film 111 is patterned in accordance with a photolithography step. The technical feature of the present invention lies in that the inside of the through hole 130 is not completely covered with the interlayer insulation film 111. In FIG. 2, the interlayer insulation film 111 is not formed on an inner wall of the through hole 130 (that is, a side wall of the organic passivation film 109).

The formation of other films, for example, the first background film 101, the inorganic passivation film 108 or the like is performed by a CVD method at a temperature of not less than 300° C. In general, by forming a CVD film or the like at a high temperature, it is possible to increase an adhesive strength between the CVD film or the like and a background film. However, since the organic passivation film 109 is already formed below the interlayer insulation film 111, when the temperature is elevated to not less than 300° C., a characteristic of the organic passivation film 109 is changed. Accordingly, the formation of the interlayer insulation film 111 is performed by a low-temperature CVD method. By forming the interlayer insulation film 111 by a low-temperature CVD method, there arises a problem with respect to an adhesive strength between other film and the interlayer insulation film 111, particularly between the common electrode 110 and the interlayer insulation film 111.

In this embodiment, as shown in FIG. 2, by forming the interlayer insulation film 111 only on a flat portion without forming the interlayer insulation film 111 on an inner wall of the through hole 130, a stress applied to the interlayer insulation film 111 can be alleviated thus preventing the film peeling-off between the interlayer insulation film 111 and the common electrode 110. As will be explained in conjunction with other embodiments, even when the interlayer insulation film 111 covers approximately a portion of the inner wall of the through hole 130, the advantageous effect of the present invention can be maintained.

An amorphous ITO film is formed on the interlayer insulation film 111 by sputtering, and the comb-teeth-shaped pixel electrode 112 is formed by a photolithography step. The pixel electrode 112 is connected with the source electrode 107 via the through hole 130. A signal voltage is applied to the pixel electrode 112 so that an electric field is generated between the pixel electrode 112 and the common electrode 110 thus rotating liquid crystal molecules 301 whereby a quantity of light which passes through the liquid crystal layer is controlled for every pixel so that an image is formed. A film thickness of the ITO film which is a transparent conductive film forming the pixel electrode 112 is approximately 40 nm to 70 nm, for example.

Figure 3:
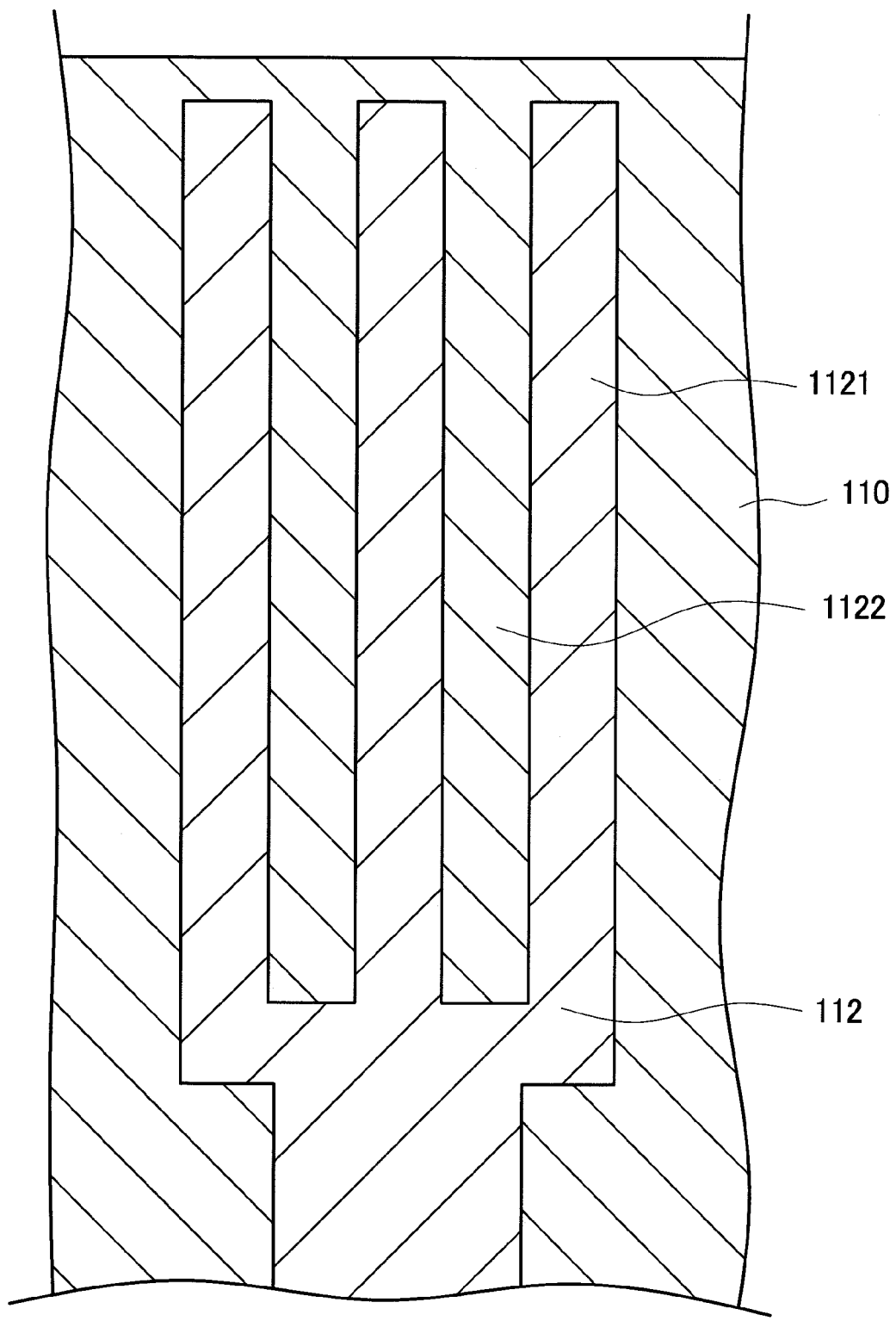
FIG. 3 is a plan view of a pixel electrode and a common electrode.

FIG. 3 is a plan view showing the relationship between the comb-teeth-shaped pixel electrode 112 and the common electrode 110 formed in a matted manner in plane. In FIG. 3, the pixel electrode 112 is arranged over the common electrode 110 with the interlayer insulation film 111 not shown in the drawing sandwiched between the pixel electrode 112 and the common electrode 110. A slit 1122 is formed between comb teeth 1121 of the pixel electrode 112. As shown in FIG. 2, lines of electric force extend toward the common electrode 110 from an upper surface of the pixel electrode 112, and the liquid crystal molecules 301 are rotated by the lines of electric force so that a quantity of light which passes through the liquid crystal layer 300 is controlled.

In FIG. 2, an alignment film 113 for imparting the initial alignment to the liquid crystal molecules 301 is formed on the pixel electrode 112. The counter substrate 200 is arranged to face the TFT substrate 100 with the liquid crystal layer 300 sandwiched therebetween. Color filters 201 are formed on an inner side of the counter substrate 200. The color filters 201 are formed of color filters of red, green and blue for every pixel so that a color image can be formed. A black matrix 202 is formed between the color filters 201 thus enhancing a contrast of the image. The black matrix 202 also plays a role of a light blocking film of the TFT thus preventing a photo current from flowing into the TFT.

An overcoat film 203 is formed so as to cover the color filters 201 and the black matrix 202. A surface of the color filters 201 and a surface of the black matrix 202 are uneven and hence, the overcoat film 203 is provided for surface leveling. The alignment film 113 which decides the initial alignment direction of the liquid crystal molecules 301 is formed on the overcoat film 203. Since the liquid crystal display device in FIG. 2 is the IPS-type liquid crystal display device, the counter electrodes 110 are formed on the TFT substrate 100 side and are not formed on the counter substrate 200 side.

As shown in FIG. 2, in the IPS-type liquid crystal display device, a conductive film is not formed on an inner side of the counter substrate 200. Accordingly, a potential of the counter substrate 200 becomes unstable. Further, electromagnetic noises from the outside invade the liquid crystal layer 300 and influence an image. To eliminate such drawbacks, an external conductive film 210 is formed on an outer side of the counter substrate 200 (a side opposite to the liquid crystal layer 300). The external conductive film 210 is formed by sputtering ITO film which is a transparent conductive film.

Figure 4:
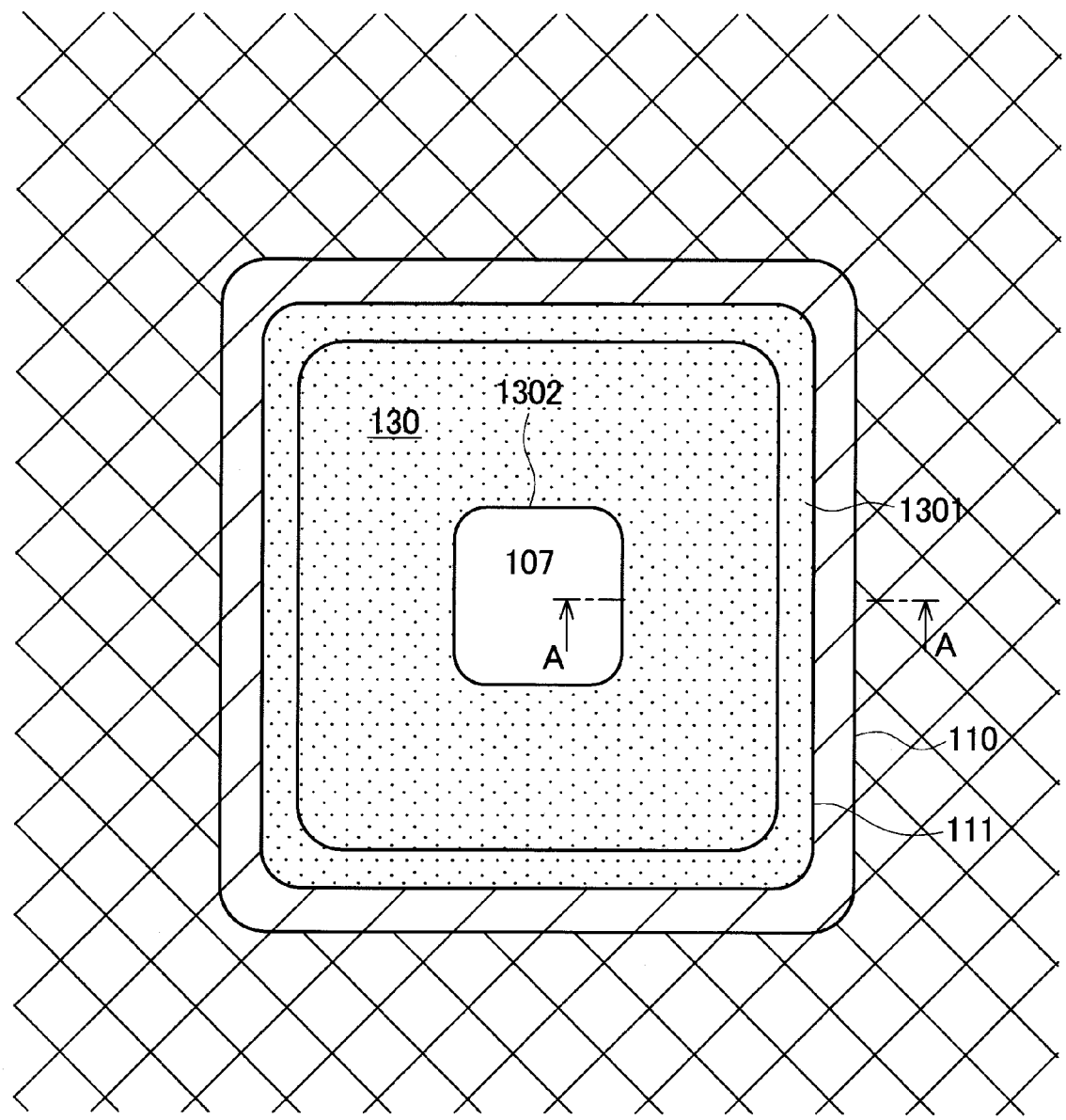
FIG. 4 is a plan view of a through hole portion of the embodiment 1.

FIG. 4 is a plan view showing an area in the vicinity of the through hole 130. In FIG. 4, the pixel electrode which is formed on an uppermost layer is omitted. In FIG. 4, in the through hole 130, a large hole 1301, a small hole 1302 and an inclined portion are present. An edge portion of the interlayer insulation film 111 is formed outside the large hole 1301 of the through hole 130 in a state where the edge portion of the interlayer insulation film 111 surrounds the large hole 1301 of the through hole 130. An edge portion of the common electrode 110 is formed more outside the interlayer insulation film 111 in a state where the edge portion of the common electrode 110 surrounds the edge portion of the interlayer insulation film 111. The source electrode 107 appear inside the small hole 1302 of the through hole 130. The source electrode 107 and the pixel electrode not shown in the drawing are connected with each other via the through hole 130.

Figure 5:
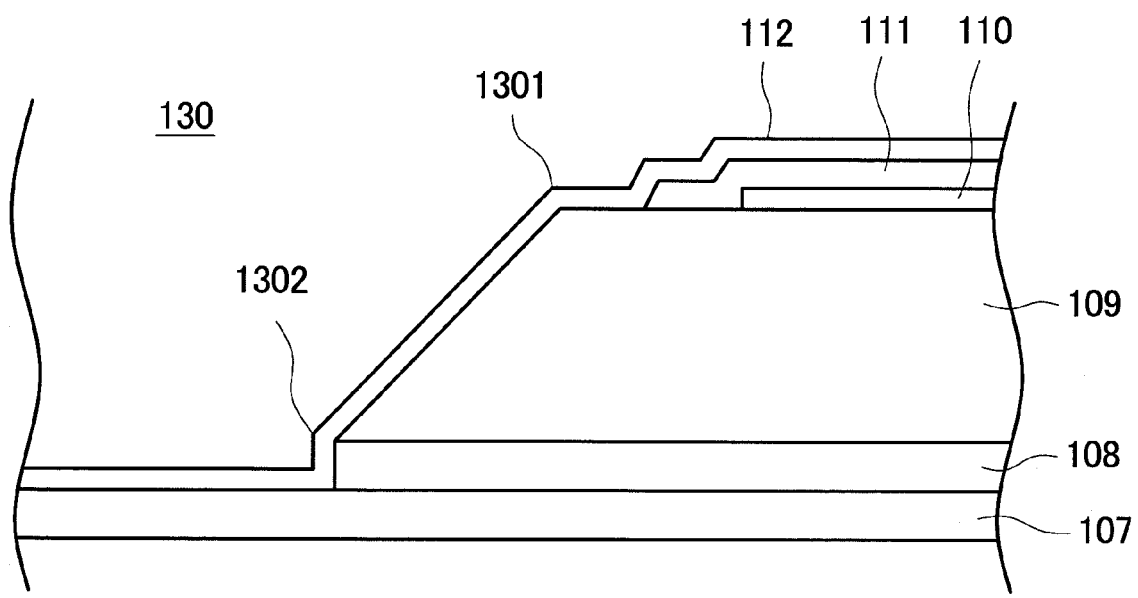
FIG. 5 is a cross-sectional view of the through hole portion of the embodiment 1.

FIG. 5 is a cross-sectional view taken along a line A-A in FIG. 4. In FIG. 5, a lower layer of the source electrode 107 is omitted. The inorganic passivation film 108 is formed on the source electrode 107, and the organic passivation film 109 is formed on the inorganic passivation film 108. The common electrode 110 is formed on the organic passivation film 109, and the interlayer insulation film 111 is formed on the common electrode 110. The common electrode 110 is formed only on a flat portion of the organic passivation film 109, and is not formed on the inclined portion of the through hole 130 (the inner wall of the through hole 130 and the side wall of the organic passivation film 109).

The interlayer insulation film 111 which covers the common electrode 110 is also formed only on a flat portion of the organic passivation film 109, and is not formed on the inclined portion of the through hole 130. The pixel electrode 112 is formed on the interlayer insulation film 111, and the pixel electrode 112 is connected with the source electrode 107 via the through hole 130. The hole formed in the inorganic passivation film 108 and the small hole formed in the organic passivation film 109 has the same size. This is because the inorganic passivation film 108 is etched using the organic passivation film 109 as a mask.

The technical feature of the present invention lies in that the interlayer insulation film 111 does not extend to the through hole 130 and is formed only on the flat portion of the organic passivation film 109. The organic passivation film 109 is formed using a resin such as an acrylic resin, while the interlayer insulation film 111 is formed using SiN (particularly SiN used in low-temperature film forming) and hence, the organic passivation film 109 and the interlayer insulation film 111 have different thermal expansion coefficients. To polycrystallize the ITO film which constitutes the electrode 112 after forming the interlayer insulation film 111, the ITO film is baked at a temperature of approximately 230° C. Here, due to the difference in thermal expansion coefficient, a stress is applied to the film formed on the organic passivation film 109.

Since the common electrode 110 which is formed directly on the organic passivation film 109 has a small thickness of 77 nm and an adhesive strength between the ITO film and the organic resin is high, the peeling-off hardly occurs between the common electrode 110 and the organic passivation film 109. On the other hand, the interlayer insulation film 111 has a large thickness of 200 nm to 300 nm and an adhesive strength between the interlayer insulation film 111 and the ITO film is not strong and hence, the peeling-off is liable to occur between the interlayer insulation film 111 and the common electrode 110. In this embodiment, by preventing the interlayer insulation film 111 from covering the whole inclined portion of the through hole 130 and by holding the interlayer insulation film 111 on the flat portion of the organic passivation film 109, a stress attributed to thermal expansion is hardly applied to the common electrode 110 and the interlayer insulation film 111 thus preventing the peeling-off between the common electrode 110 and the interlayer insulation film 111.

Figure 6:
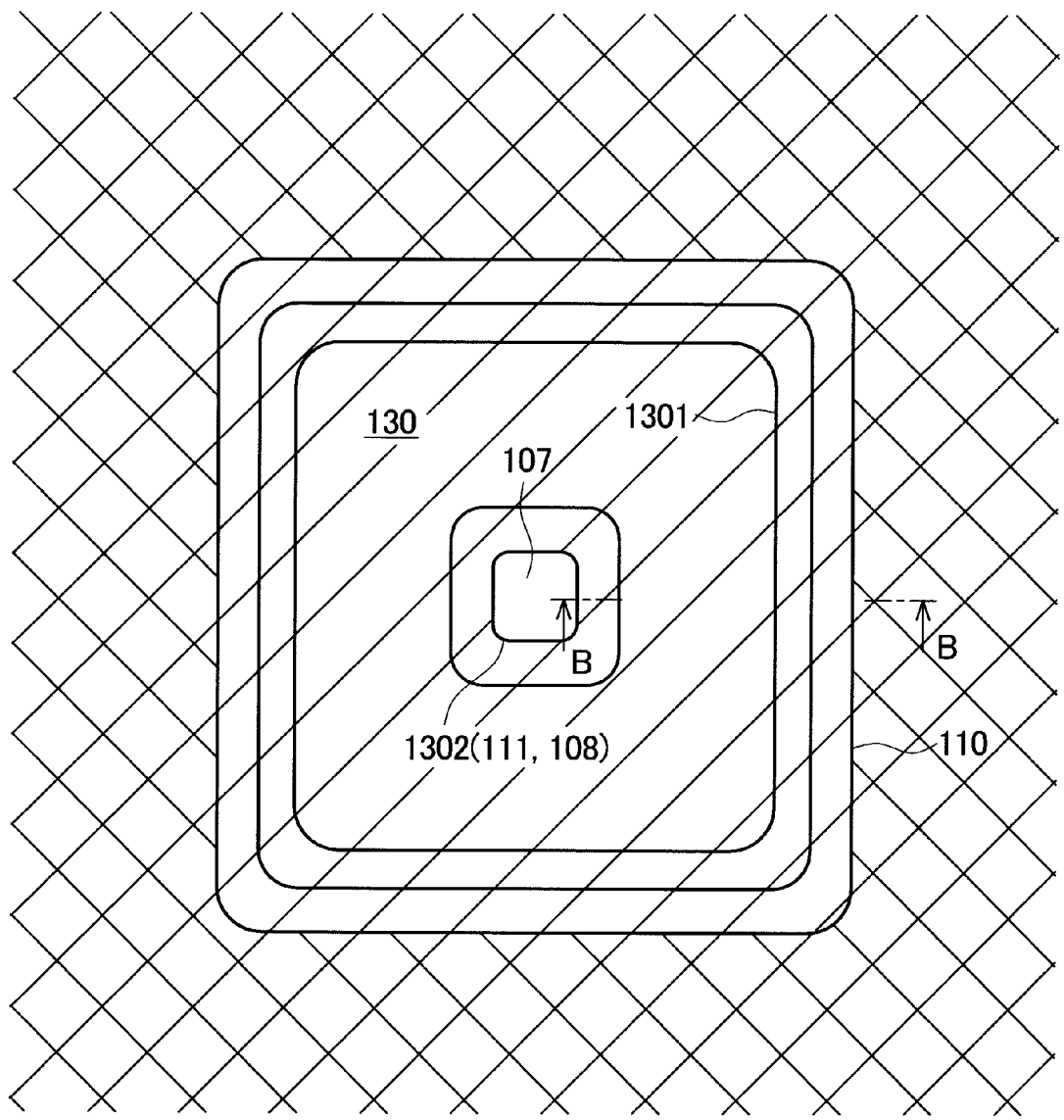
FIG. 6 is a plan view of a through hole portion of a conventional example.

FIG. 6 is a plan view of an area in the vicinity of a through hole 130 in a conventional example provided for a comparison purpose. In FIG. 6, a pixel electrode is omitted. A common electrode 110 is formed in a state where the common electrode 110 surrounds the periphery of a large hole 1301 of the through hole 130 in FIG. 6. An interlayer insulation film 111 further extends to the inside of a small hole of the through hole formed in an organic passivation film 109 thus forming the small hole 1302 of the through hole 130. A source electrode 107 is observed in the small hole 1302 of the through hole 130.

Figure 7:
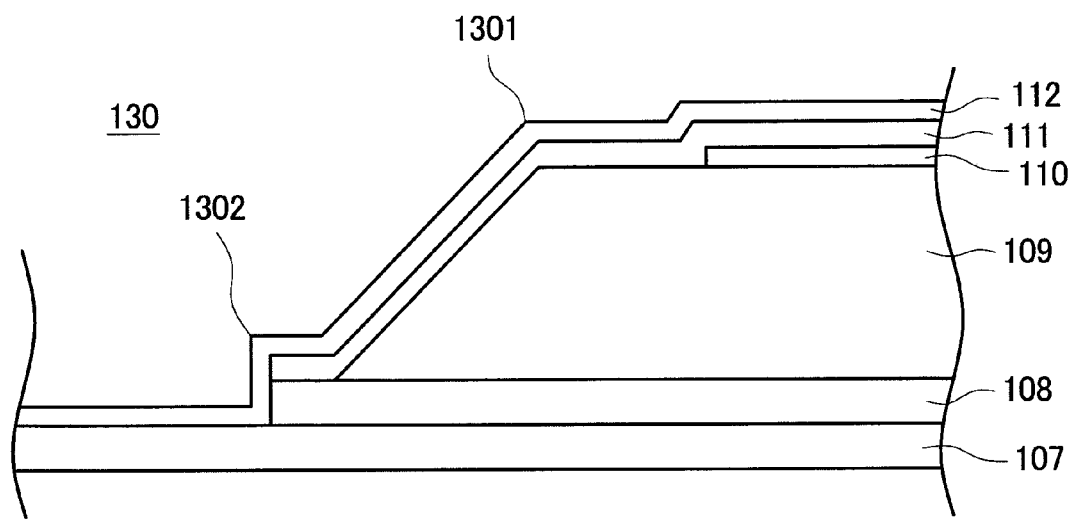
FIG. 7 is a cross-sectional view of the through hole portion of the conventional example.

FIG. 7 is a cross-sectional view taken along a line B-B in FIG. 6. In FIG. 7, an inorganic passivation film 108 is formed on the source electrode 107. The organic passivation film 109 is formed on the inorganic passivation film 108. The common electrode 110 is formed on an upper surface of the organic passivation film 109, and the interlayer insulation film 111 is formed so as to cover the common electrode 110. In FIG. 7, the interlayer insulation film 111 covers an inclined portion of the through hole 130, the interlayer insulation film 111 is brought into contact with the inorganic passivation film 108, and the small hole 1302 of the through hole 130 is formed by the inorganic passivation film 108 and the interlayer insulation film 111. In the constitution shown in FIG. 6 and FIG. 7, the organic passivation film 109 in the through hole 130 portion is completely covered with the interlayer insulation film 111.

Figure 8:
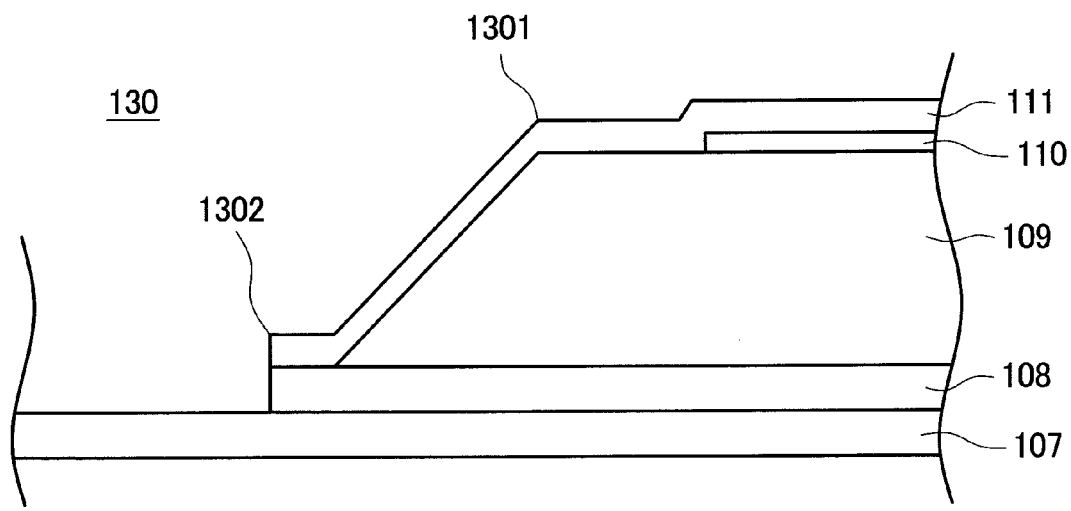
FIG. 8 is a cross-sectional view of the through hole portion of the conventional example in a state where a pixel electrode is removed.

FIG. 8 is a cross-sectional view of the through hole 130 portion before the pixel electrode 112 shown in FIG. 7 is formed. A process for forming the through hole 130 in a state shown in FIG. 8 is as follows. The inorganic passivation film 108 is formed on the source electrode 107, and the organic passivation film 109 is formed on the inorganic passivation film 108. Subsequently, the through hole is formed in the organic passivation film 109. Then, the interlayer insulation film 111 is formed, a photo resist is applied to the interlayer insulation film 111 by coating, and the photo resist is patterned. Thereafter, the interlayer insulation film 111 and the inorganic passivation film 108 are simultaneously etched by dry etching using the same resist pattern thus forming the small hole 1302 of the through hole 130. Both the inorganic passivation film 108 and the interlayer insulation film 111 are formed using SiN and hence, these films can be simultaneously etched.

Figure 9:
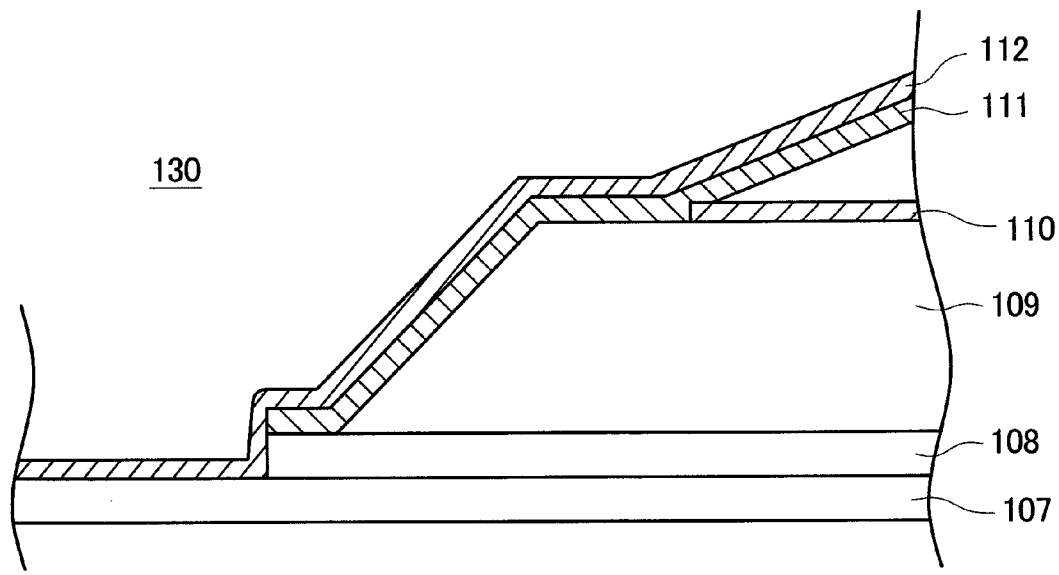
FIG. 9 is a cross-sectional view of an area in the vicinity of the through hole portion showing a drawback of the conventional example.

Thereafter, an ITO film which becomes the pixel electrode 112 is applied to the interlayer insulation film 111, and the pixel electrode 112 is patterned into a comb-teeth-shaped electrode by a photolithography step. After patterning the pixel electrode 112, to decrease the resistance of the pixel electrode 112, a TFT substrate 100 on which the pixel electrode 112 is formed is baked at a temperature of approximately 230° C. thus poly-crystallizing the ITO film. However, in such a heating step, the film peeling-off shown in FIG. 9 occurs between the interlayer insulation film 111 and the common electrode 110.

Figure 10:
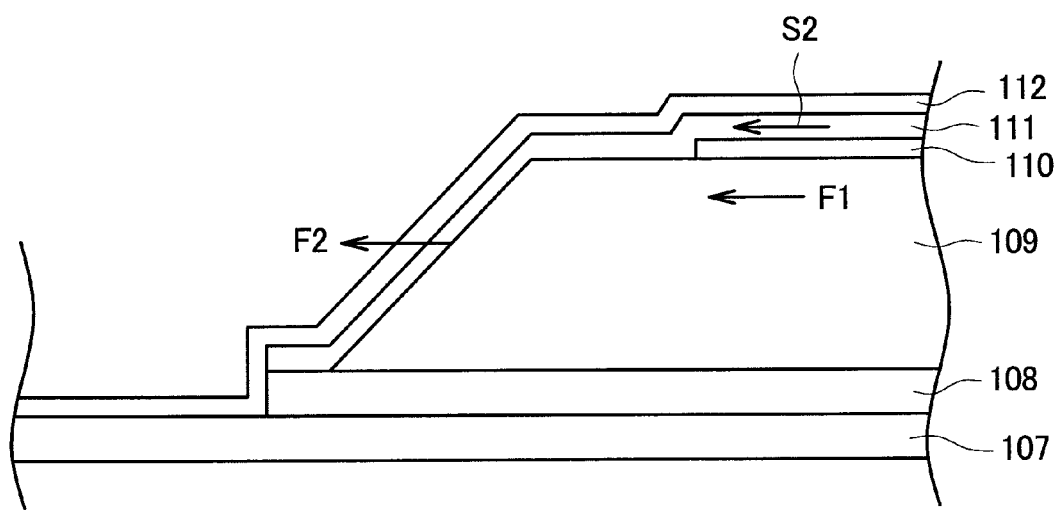
FIG. 10 is a schematic view showing a thermal expansion stress in the conventional example.

It is thought that this film peeling-off occurs due to a mechanism shown in FIG. 10. FIG. 10 is a cross-sectional view taken along a line B-B in FIG. 6. Assume a case where after the pixel electrode 112 is formed, the temperature is elevated so as to poly-crystallize the ITO film. In this case, a thermal expansion coefficient of the organic passivation film 109 is larger than a thermal expansion coefficient of the interlayer insulation film 111 and hence, a force which pulls the interlayer insulation film 111 in the lateral direction is generated. This force can be divided into a force F1 which is applied to an interface between the organic passivation film 109 and the common electrode 110 and a force F2 which pulls the interlayer insulation film 111 in the vicinity of the inclined portion of the through hole 130. Here, the stress F1 which is generated between the organic passivation film 109 and the common electrode 110 may be considered, since a thickness of the common electrode 110 is small, to become a stress on an interface between the interlayer insulation film 111 and the common electrode 110.

In FIG. 10, on a small hole 1302 side of the through hole 130, the inorganic passivation film 108 and the interlayer insulation film 111 are laminated to each other. Since the inorganic passivation film 108 and the interlayer insulation film 111 are formed of the same material, that is, SiN and hence, an adhesive strength between these films is extremely strong. In such structure, even when the organic passivation film 109 tries to expand, the expansion of the organic passivation film 109 in the lateral direction is completely suppressed by the inorganic passivation film 108. The influence exerted by this suppression appears as a stress on the interface between the interlayer insulation film 111 and the common electrode 110.

That is, in the constitution shown in FIG. 10, a stress S2 applied to the interface between the interlayer insulation film 111 and the common electrode 110 due to the thermal expansion of the organic passivation film 109 is a stress which is obtained by adding a stress attributed to the stress F2 shown in FIG. 10 to the stress F1 generated on the interface between the organic passivation film 109 and the common electrode 110.

So long as the interlayer insulation film 111 is not broken, the force F2 in FIG. 10 is converted into a force which pulls the interlayer insulation film 111 in the horizontal direction. On the other hand, a film thickness of the ITO film which constitutes the common electrode 110 is smaller than a film thickness of the interlayer insulation film 111 and, at the same time, an adhesive strength of the organic passivation film 109 is strong and hence, the film peeling-off does not occur between the organic passivation film 109 and the common electrode 110. Accordingly, the film peeling-off occurs between the common electrode 110 and the interlayer insulation film 111.

Figure 11:
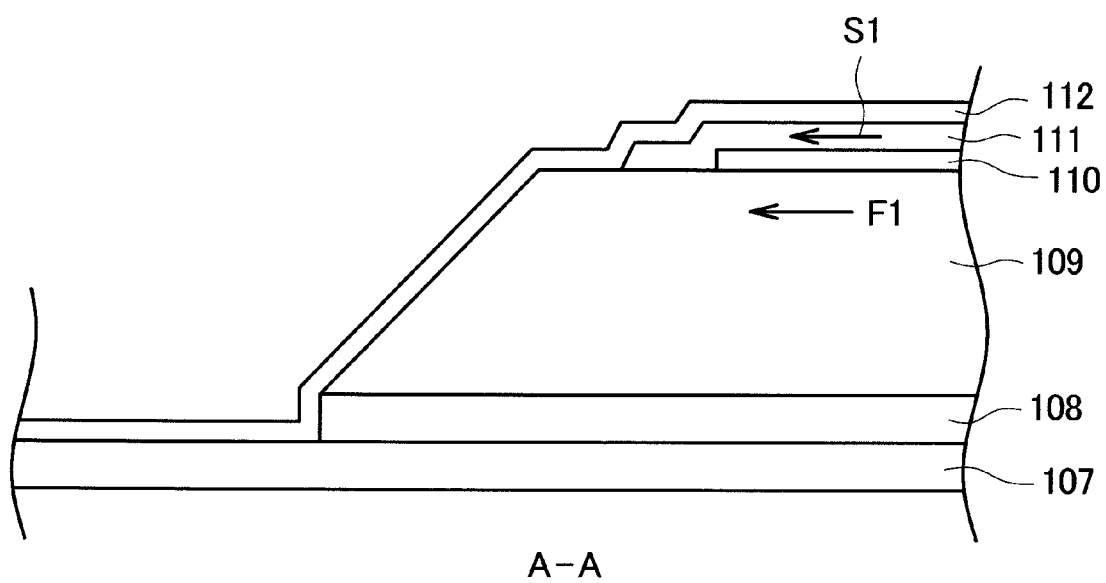
FIG. 11 is a schematic view showing a thermal expansion stress in the present invention.

FIG. 11 is a schematic view showing a stress when a temperature is elevated for poly-crystallizing the ITO film on the interlayer insulation film 111 in the constitution of this embodiment. FIG. 11 is a cross-sectional view taken along a line A-A in FIG. 4. In FIG. 11, the stress F1 generated between the organic passivation film 109 and the common electrode 110 due to the difference in thermal expansion coefficient when the temperature is elevated is substantially equal to the stress F1 shown in FIG. 10. However, in FIG. 11, the interlayer insulation film 111 is not formed in the inside of the through hole 130. Accordingly, the force F2 on the inclined portion of the through hole 130 which is generated in the conventional example shown in FIG. 10 is not present.

The stress generated between the organic passivation film 109 and the common electrode 110 may be considered substantially equal to the stress generated between the common electrode 110 and the interlayer insulation film 111. Accordingly, in the constitution of this embodiment shown in FIG. 11, the stress S1 generated between the interlayer insulation film 111 and the common electrode 110 due to the difference in thermal expansion between the organic passivation film 109 and the interlayer insulation film 111 or the like becomes substantially equal to the stress F1 generated between the organic passivation film 109 and the common electrode 110 and hence, the stress S1 can be reduced compared to the conventional example. Accordingly, it is possible to prevent the film peeling-off between the common electrode 110 and the interlayer insulation film 111.

50 pieces of TFT substrates 100 having the constitution of this embodiment and 50 pieces of TFT substrate 100 having the constitution of the conventional example are manufactured respectively, these TFT substrates 100 are heated by a hot plate at 240° C. for 20 minutes, and the presence or the non-presence of film peeling-off are confirmed. As a result, according to the TFT substrates 100 having the constitution of this embodiment, the number of TFT substrates 100 which suffer from the film peeling-off is zero. To the contrary, in the case of TFT substrates having the conventional constitution, out of 50 pieces of TFT substrates 100, the film peeling-off occurs between the common electrode 110 and the interlayer insulation film 111 in 7 pieces of TFT substrates 100. In this manner, the advantageous effect of the present invention is extremely large.

The direction of an electric current which flows into the TFT is suitably changed over due to AC inversion driving of the liquid crystal display device. Accordingly, the source region and the drain region of the TFT are changed over and, further, the source electrode and the drain electrode are also changed over suitably. However, in the explanation of this embodiment, a side which is connected to the pixel electrode is referred to as the source region or the source electrode. The same goes for embodiments explained hereinafter.

[Embodiment 2]

Figure 12:
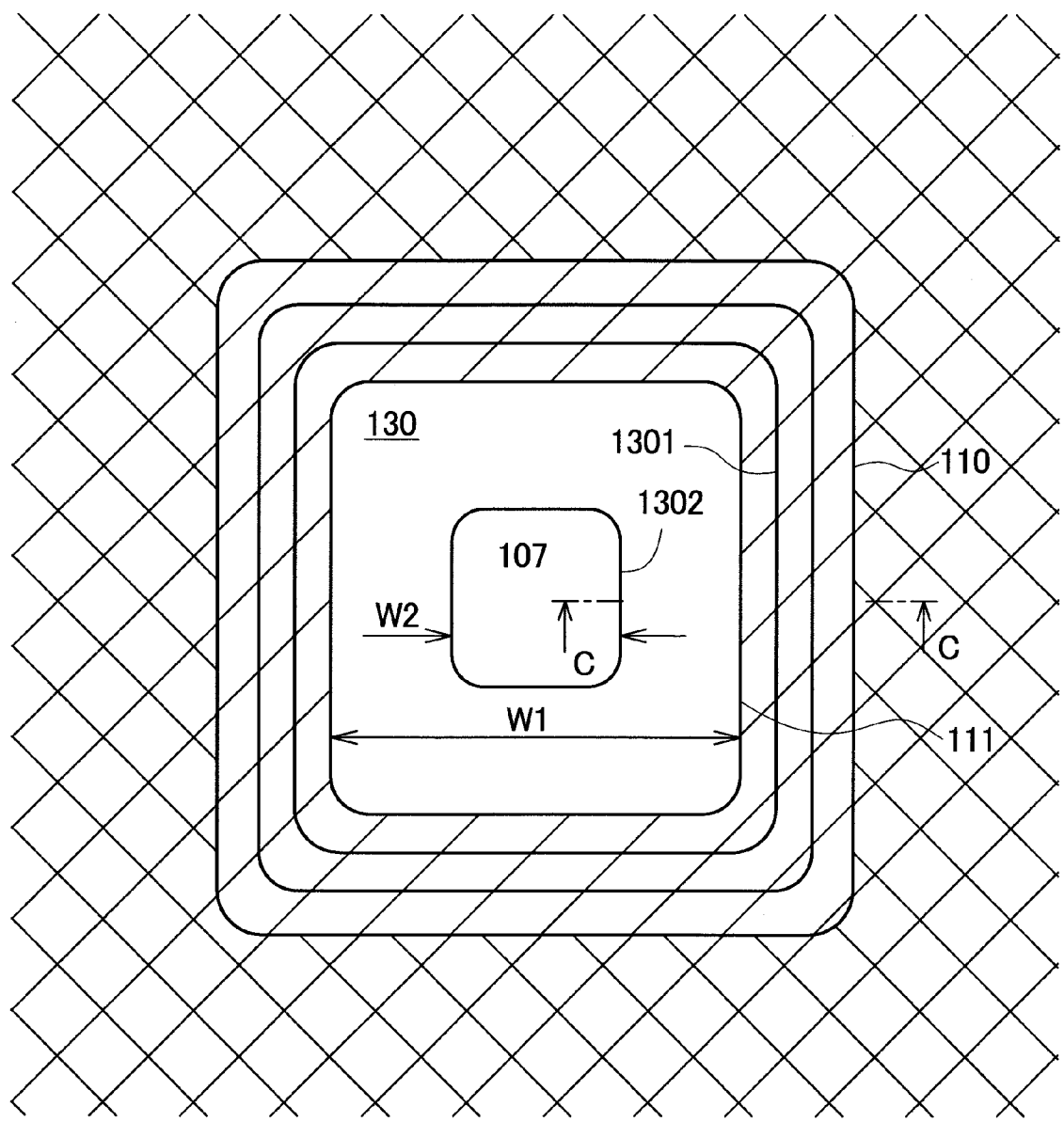
FIG. 12 is a plan view of a through hole portion of an embodiment 2.
Figure 13:
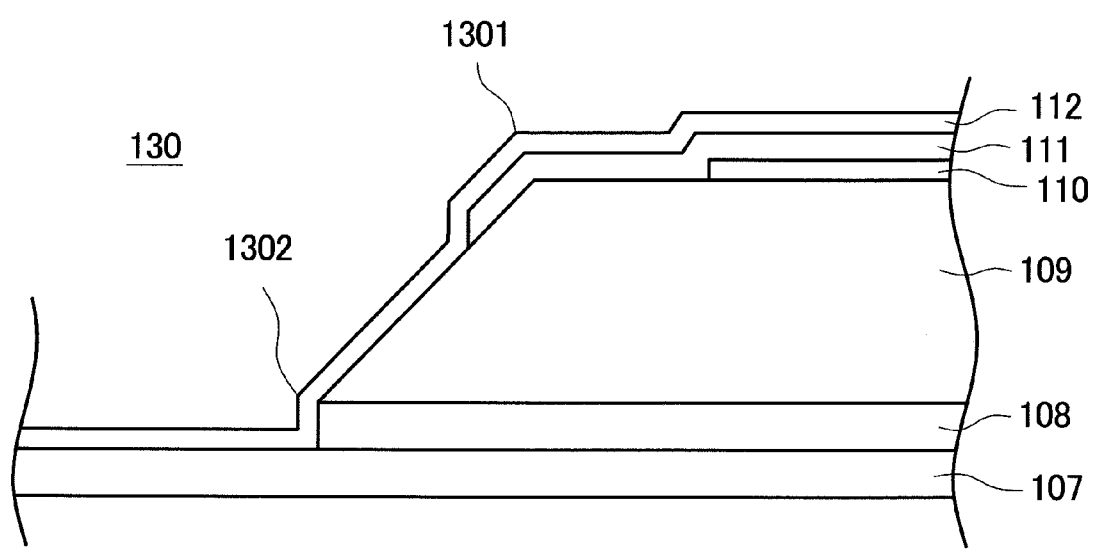
FIG. 13 is a cross-sectional view of the through hole portion of the embodiment 2.

FIG. 12 is a plan view of an area in the vicinity of a through hole 130 in the embodiment 2. FIG. 12 differs from FIG. 4 showing the embodiment 1 only with respect to a range where an interlayer insulation film 111 is formed. That is, in this embodiment, the interlayer insulation film 111 covers a portion of an inclined portion of the through hole 130. FIG. 13 is a cross-sectional view taken along a line C-C in FIG. 12. In FIG. 13, the interlayer insulation film 111 covers an upper portion of the inclined portion of the through hole 130. However, the interlayer insulation film 111 does not extend to a lower portion of the through hole 130 and, at the same time, is not brought into contact with an inorganic passivation film 108.

Also in this embodiment, the inorganic passivation film 108 is etched by dry etching using an organic passivation film 109 as a mask and hence, the inorganic passivation film 108 does not appear on a surface. However, even if the inorganic passivation film 108 is configured to appear inside the organic passivation film 109 using a different process, it is necessary to prevent the interlayer insulation film 111 and the inorganic passivation film 108 from coming into contact with each other. The prevention of contact between the interlayer insulation film 111 and the inorganic passivation film 108 is necessary for preventing the stress attributed to thermal expansion of the organic passivation film 109 from becoming excessively large.

In this embodiment, the stress attributed to thermal expansion is slightly increased compared to the case of the embodiment 1 by an amount corresponding to the formation of the interlayer insulation film 111 also on the inclined portion of the through hole 130. However, the stress attributed to thermal expansion of this embodiment is far smaller than the stress attributed to thermal expansion in the conventional example. This is because this embodiment is not constituted such that the thermal expansion of the organic passivation film 109 is completely blocked by the interlayer insulation film 111 and the inorganic passivation film 108. Accordingly, an advantageous effect with respect to the film peeling-off acquired by this embodiment becomes substantially equal to the corresponding advantageous effect with respect to the film peeling-off acquired by the embodiment 1.

In this embodiment, to prevent the interlayer insulation film 111 and the inorganic passivation film 108 from coming into contact with each other, it is inevitably necessary to set an opening diameter (or a width of an opening portion) W1 of the interlayer insulation film 111 shown in FIG. 12 larger than a small diameter (or a width of the small hole) W2 of the organic passivation film 109. Further, to take the accuracy of alignment of a mask into consideration, it is necessary that the relationship of W2+2 μm<W1 is satisfied.

The organic passivation film 109 also functions as a leveling film and hence, it is difficult to decrease a film thickness of the organic passivation film 109 even when a pitch of pixels is made small. In such a circumstance, it is also difficult to decrease a diameter of the through hole 130. By forming the interlayer insulation film 111 such that the interlayer insulation film 111 extends to the inclined portion of the through hole 130 as in the case of this embodiment, the common electrode 110 can be formed such that the common electrode 110 extends to an area in the vicinity of a large hole 1301 of the through hole 130 and hence, a utilization ratio of light in each pixel can be enhanced.

[Embodiment 3]

The case in which the present invention adopts the top-gate-type TFT has been explained with respect to the embodiment 1 and the embodiment 2. However, the present invention is also applicable to a bottom-gate-type TFT in the same manner besides the top-gate-type TFT.

Figure 14:
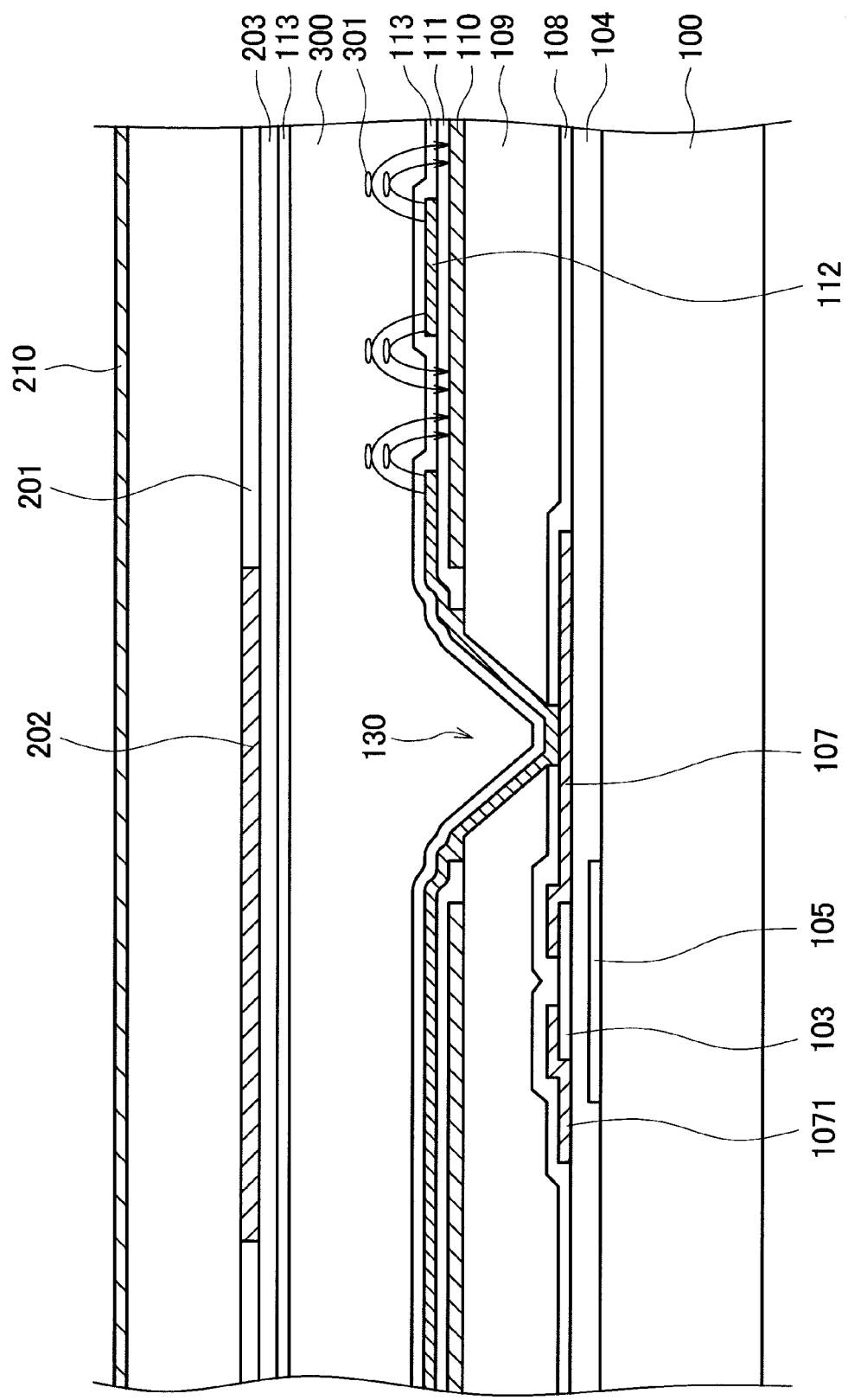
FIG. 14 is a cross-sectional view of a pixel portion of a liquid crystal display device of an embodiment 3.
Figure 15:
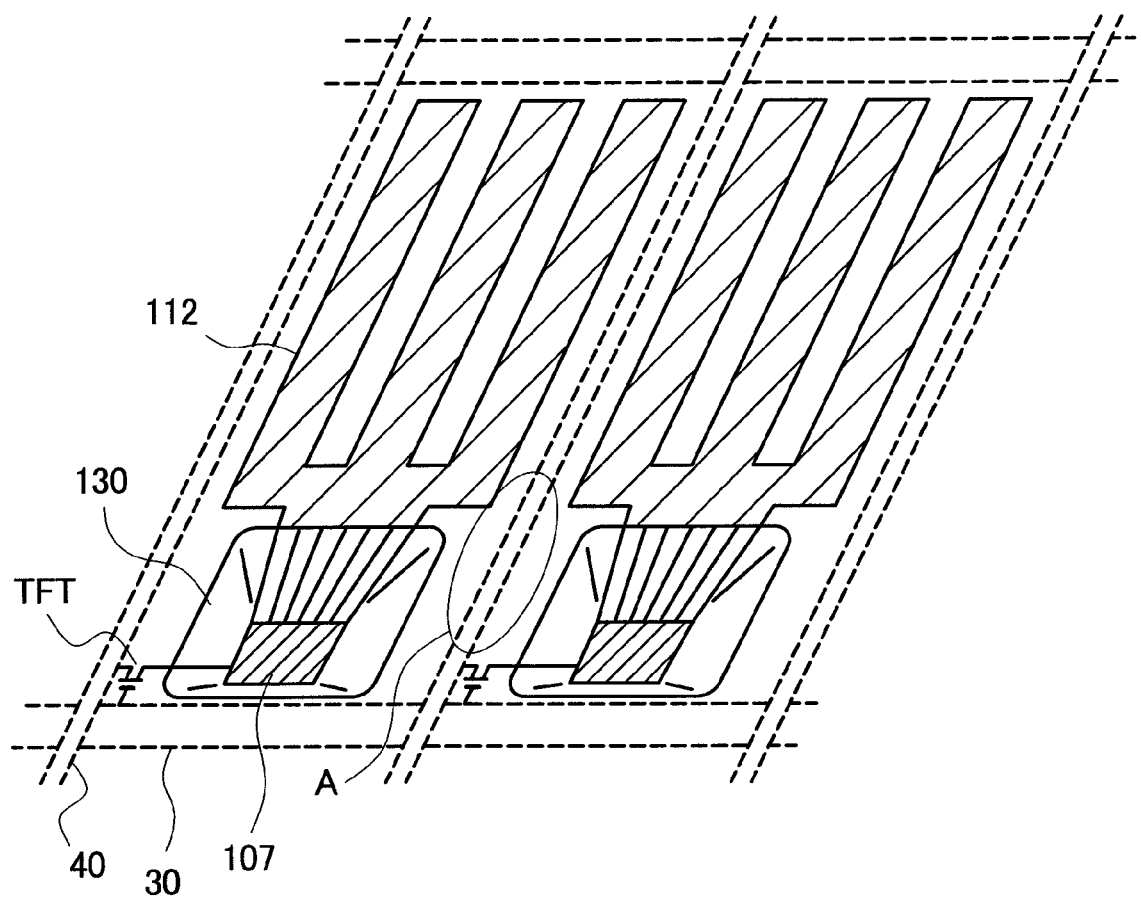
FIG. 15 is a perspective view of a pixel portion when a pixel is small.

FIG. 14 is a cross-sectional view of the pixel portion when the present invention is applied to a liquid crystal display device which uses the bottom-gate-type TFT. Except for the constitution of the TFT, the constitution of the pixel portion in this embodiment is substantially equal to the constitution of the pixel portion shown in FIG. 2 explained in conjunction with the embodiment 1. In FIG. 14, a gate electrode 105 is formed on a TFT substrate 100. A gate insulation film 104 is formed so as to cover a gate electrode 105. A semiconductor layer 103 is formed over the gate electrode 105 by way of the gate insulation film 104.

In FIG. 14, the gate electrode 105 is directly formed on a glass substrate, and a background film similar to the background film explained in conjunction with FIG. 2 is not formed. It is because impurities from glass are blocked by the gate electrode 105 and do not reach the semiconductor layer 103. However, a background film may be formed in the same manner as the constitution shown in FIG. 2. The semiconductor layer 103 shown in FIG. 14 is formed using a-Si in many cases. In this case, a thickness of the semiconductor layer 103 is approximately 150 nm. A source electrode 107 and a drain electrode 1071 are connected with a source region and a drain region of the semiconductor layer 103 respectively. Between the semiconductor layer 103 and the source electrode 107 or between the semiconductor layer 103 and the drain electrode 1071, an n+Si layer not shown in the drawing which has a thickness of approximately 50 nm is formed for establishing an ohmic contact between them.

An inorganic passivation film 108 is formed so as to cover the bottom-gate-type TFT formed in such a manner. In this case, the inorganic passivation film 108, different from the top-gate-type TFT explained in conjunction with the embodiment 1 or the embodiment 2 which uses poly-Si for forming the semiconductor layer, is formed by a low-temperature CVD method in the same manner as the interlayer insulation film formed between a common electrode and a pixel electrode formed later. A semiconductor layer of the TFT is formed using a-Si in this embodiment and hence, when a high-temperature CVD method is used, there exists a possibility that a characteristic of a-Si is changed. In this case, the inorganic passivation film 108 formed by a low-temperature CVD method is not brought into direct contact with the ITO film and hence, there is no possibility that a film peeling-off problem arises with respect to such a portion.

The constitution and the process after the formation of the inorganic passivation film 108 are substantially equal to the corresponding constitution and process explained in conjunction with FIG. 2 and hence, their explanation is omitted. That is, although a through hole 130 is formed for connecting the source electrode 107 and a pixel electrode 112 in FIG. 14, with respect to the constitution of the through hole 130 portion and an area in the vicinity of the through hole portion 130 portion which constitutes the technical features of the present invention, the constitution explained in conjunction with the embodiment 1 and the embodiment 2 is directly applicable. In this manner, the present invention is applicable to any liquid crystal display device and can acquire the substantially equal advantageous effects irrespective of the constitution of the TFT.

As has been explained heretofore, the prevention of the film peeling-off becomes particularly important when an area of the pixel becomes small. For example, to enable a display of VGA on a screen of 3 inches, a horizontal pitch of pixels becomes 32 μm. There has been a demand for the realization of the display of VGA also in the screen of not more than 3 inches. In this case, the horizontal pitch of the pixels becomes not more than 32 μm. The present invention is extremely advantageous in applying an IPS method to a product having such a small pixel pitch.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device in which a first insulation film is formed on a source electrode which is connected with a source region of a thin film transistor so as to cover the source electrode, an organic insulation film is formed on the first insulation film, a common electrode is formed on the organic insulation film, a second insulation film is formed on the common electrode so as to cover the common electrode, and a pixel electrode which has a comb-teeth-shaped portion is formed on the second insulation film, wherein the organic insulation film and the first insulation film have a through hole having a large hole corresponding to an upper portion of the organic insulation film, a small hole corresponding to the first insulation film and an inclined portion formed in the organic insulation film, a first opening portion is formed in the second insulation film such that the first opening portion surrounds the large hole of the through hole, a second opening portion is formed in the common electrode such that the second opening portion surrounds the large hole of the through hole, the pixel electrode is connected with the source electrode via the through hole, the first opening portion which is formed in the second insulation film is larger than the large hole formed in the organic insulation film and is smaller than the second opening portion formed in the common electrode, an edge portion of the second insulation film extends beyond an edge of the common electrode towards the large hole formed in the organic insulation film a distance that is greater than a thickness of the second insulation film, and an entirety of a part of a lower surface of the pixel electrode which surrounds the first opening portion has contact with an upper surface of the second insulation film.

2. The liquid crystal display device according to claim 1, wherein in the through hole, the small hole formed in the first insulation film is formed by etching using the organic insulation film as a mask.

3. The liquid crystal display device according to claim 1, wherein the first insulation film and the second insulation film are formed using SiN.

4. The liquid crystal display device according to claim 1, wherein the second insulation film is formed using SiN at a temperature of not more than 300° C.

5. A liquid crystal display device in which a first insulation film is formed on a source electrode which is connected with a source region of a thin film transistor so as to cover the source electrode, an organic insulation film is formed on the first insulation film, a common electrode is formed on the organic insulation film, a second insulation film is formed on the common electrode so as to cover the common electrode, and a pixel electrode which has a comb-teeth-shaped portion is formed on the second insulation film, wherein the organic insulation film and the first insulation film have a through hole having a large hole corresponding to an upper portion of the organic insulation film, a small hole corresponding to the first insulation film and an inclined portion formed in the organic insulation film, an opening portion is formed in the second insulation film in the vicinity of the through hole, the pixel electrode is connected with the source electrode via the through hole, and the opening portion which is formed in the second insulation film is larger than the small hole formed in the first insulation film, the second insulation film is not brought into contact with the first insulation film, an edge portion of the second insulation film extends beyond an edge of the common electrode towards the large hole formed in the organic insulation film a distance that is greater than a thickness of the second insulation film, and an entirety of a part of a lower surface of the pixel electrode which surrounds the first opening portion has contact with an upper surface of the second insulation film.

6. The liquid crystal display device according to claim 5, wherein the first insulation film and the second insulation film are formed using SiN.

7. The liquid crystal display device according to claim 5, wherein the second insulation film is formed using SiN at a temperature of not more than 300° C.

* * * * *

UNITED STATES PATENT AND TRADEMARK OFFICE
CERTIFICATE OF CORRECTION

PATENT NO. : 8,830,429 B2
APPLICATION NO. : 12/878109
DATED : September 9, 2014
INVENTOR(S) : Ishigaki et al.

It is certified that error appears in the above-identified patent and that said Letters Patent is hereby corrected as shown below:

On the Title Page

Item (73) Assignee should read:

Japan Display Inc. Tokyo, Japan; and
Panasonic Liquid Crystal Display Co., Ltd. Hyogo-ken, Japan Signed and Sealed this
Tenth Day of February, 2015

Michelle K. Lee
*Deputy Director of the United States Patent and Trademark Office*